Patented Dec. 8, 1953

2,662,061

UNITED STATES PATENT OFFICE 2,662,061

PREPARATION OF LATEX STABILIZER DISPERSIONS

John R. Gilcrease and Mack C. Fuqua, Baton Rouge, La., assignors to Standard Oil Development Company, a corporation of Delaware No Drawing. Application August 30, 1950, Serial No. 182,418

1 Claim. (Cl. 252—311)

This invention relates to the preparation of stabilizer dispersions for addition to rubber latices. In particular, the invention relates to the preparation of aqueous dispersions of phenolic anti-oxidants which are added to latices of rubber-like materials in order to stabilize the latter.

It is well-known that elastomers, and particularly synthetic polymers prepared by polymerization of diolefins or of diolefin-containing mixtures in aqueous emulsion require stabilization against the detrimental effects of oxygen, ozone, heat and sunlight. Agents useful as stabilizers or anti-oxidants include various arylamines such as phenyl - beta - naphthylamine, phenyl - alpha-naphthylamine, dinaphthyl-p-phenylene diamine, diphenyl-p-phenylene diamine, diphenyl propylene diamine, p-isopropoxy diphenylamine, m-toluylene diamine, aldol-alpha-naphthylamine, heptylated diphenylamine, disalicylal-propylene diamine, hexachlornaphthalene, p-(p-tolyl-sulfonylamido)-diphenylamine, aminophenol, various hydrocarbon waxes, hydroquinone-type materials such as hydroquinone monobenzyl ether, and the like.

Another important class of rubber stabilizers includes various phenols or thiophenols such as hydroquinone, catechol, 3,5-diethyl catechol, beta-naphthol, diamyl dihydroxyphenyl sulfide or disulfide, and particularly alkylated phenols having a total of 2 to 11 carbon atoms distributed in one to three alkyl groups such as the various dimethyl phenol isomers, 3-methyl-4-tert-butyl phenol, tert-amyl phenol, 2-methyl-4,6-di-tert-butyl phenol, the di-tert-amyl cresols, and the like. Still another class includes phenolaldehyde and phenol-ketone condensation products, and notably bis-phenols such as 2,2-bis(4-hydroxyphenyl)-propane, 2,2-bis(4-hydroxy-3-methylphenyl) propane, 2,2-bis(2-hydroxy-5-chlorophenyl) butane as well as sulfur-linked bis-phenols such as bis(2-hydroxy-5-methylphenyl) sulfide and bis(2-hydroxy-5-chlorophenyl) sulfoxide. In general these compounds can be described by the formula $R_1$—X—$R_2$ wherein X is an alkylidene radical of 1 to 3 carbon atoms, a sulfide radical or a sulfoxide radical and wherein $R_1$ and $R_2$ are hydroxyphenyl groups, monochlorinated hydroxyphenyl groups or monoalkylated hydroxyphenyl groups having 1 to 3 carbon atoms per alkyl group.

It has been known heretofore that when stabilizers of the aforementioned type were milled into an elastomer, the useful life of the latter was beneficially increased due to an improvement in its resistance to harmful external effects. However, it also became apparent, especially in the case of synthetic emulsion polymers, that the addition of a stabilizer to the elastomer in the dry state after coagulation left much to be desired, since the synthetic elastomers exhibit a relatively high degree of susceptibility to deterioration while still in the latex stage. Accordingly, the art has been developing various procedures for adding stabilizers to the elastomer while in the latex stage, as described, for instance, in U. S. Patents 2,270,959; 2,510,882 or in application Serial No. 565,572, filed on November 28, 1944, now Patent No. 2,565,998, issued on August 28, 1951.

According to the known procedures the stabilizer was added to the latex either in solution in alkali, if soluble therein as in the case of some of the phenolic substances, or in aqueous suspension or dispersion. However, the solution method has proved to be of relatively minor utility since it is applicable only to a very limited number of the more soluble stabilizers and, due to the soluble nature of these agents, results in an uneconomical loss of stabilizer during the subsequent washing of the polymer. On the other hand, the addition of stabilizer in dispersed form has heretofore proved costly, both because the known methods of forming such dispersions, notably ball-milling, have been exceedingly time consuming and because the resulting dispersions were normally rather coarse and colloidally unstable even when protective agents such as gum arabic were present, and therefore tended to prefloc or precipitate before an intimate admixture of the dispersed stabilizer and the elastomer particles of the latex could be effected. Thus an effective utilization of only a fraction of the stabilizer added was obtained.

A new method has now been discovered whereby aqueous stabilizer dispersions of fine particle size and superior colloidal stability can be prepared in a very short time. Whereas the prior art method dispersed the stabilizer while the latter was in solid form, the essence of the present invention requires that the stabilizer be dispersed while in a molten condition, preferably in the presence of a highly concentrated aqueous solution of a dispersing agent such as an alkaline soap of a saturated or unsaturated fatty acid of 8 to 24 carbon atoms, a petroleum sulfonate, an alkyl sulfate or other known dispersing agents of the organic sulfate or sulfonate type having the formula $RSO_3M$ wherein R is an alkoxy radical having 8 to 18 carbon atoms or an alkyl radical of 12 to 30 carbon atoms or an alkyl substituted phenyl or naphthyl radical having 12 to 30 aliphatic carbon atoms.

Particularly good results are obtained when the stabilizer is first melted in the presence of a high-molecular weight fatty acid in the absence of water, and soap is then formed in situ by adding a suitable alkali to the melt. Instead of using the dispersing agent in 100% concentration, similarly good results can also be obtained when the melting and dispersing step is carried out in the presence of aqueous solutions of a dispersing agent, provided that such a solution is rather concentrated and contains at least 25%, or preferably 40 to 80% of the active dispersing agent.

Examples of useful dispersing agents include potassium octyl sulfate $C_8H_{17}O \cdot SO_3K$, sodium lauryl sulfate $C_{12}H_{25}O \cdot SO_3Na$, sodium cetyl sulfate $C_{16}H_{33}O \cdot SO_3Na$, or ammonium octadecyl sulfate $C_{18}H_{37}O \cdot SO_3NH_4$; or potassium dodecyl sulfonate $C_{12}H_{25}SO_3K$, sodium tricontyl sulfonate $C_{30}H_{61}SO_3Na$, or an alkali sulfonate of a petroleum base stock having the appropriate molecular weight; or it may be an alkyl aromatic sulfonate such as sodium salt of dodecyl benzene sulfonic acid or of the condensation product of formaldehyde and benzene sulfonic acid known as "Daxad."

The useful alkali metal or ammonium soaps include salts of caprylic, carnaubic, or mixed coconut oil acids, the alkali metal oleates and stearates being particularly effective, especially when the soap is formed in a situ by adding the alkali directly to a mixture consisting of the fatty acid and stabilizer, while the mixture is maintained at a temperature above the melting point of the stabilizer, e. g. at a temperature above between 130° F. and 300° F., or preferably between 200° F. and 250° F. in the case of the higher melting stabilizers. Where temperatures near or above the boiling point of water are required, the operation is preferably carried out in a closed vessel under pressure.

The invention is applicable to rubber stabilizers which can be melted below their decomposition point, and which have a fairly sharp melting point or a narrow melting range of not more than 10° F. and preferably not more than 5° F. The purer the compound, and hence the sharper the melting point, the better suited it is for the purposes of the present invention, one of whose objects is the formation of coagulation resistant stabilizer dispersions wherein the stabilizer particles are of very fine size. Dispersions of particularly high quality and effectiveness can be prepared in the new manner from dialkylated cresols having 4 to 5 carbon atoms per alkyl group, notably 2,6-di-tert-butyl-4-methyl phenol which has a melting point of 154–156° F.

On the other hand, thermoplastic substances such as the low-temperature reaction product of diphenylamine and acetone which melts between 185–205° F. fail to give satisfactory dispersions by the novel method, except where the thermoplastic substance is admixed with a large amount of a sharp melting stabilizer.

In general, the dispersing aid is added to the stabilizer in an initial concentration about 5 to 60% or even 100% based on the latter and after an initial dispersion is formed, an aqueous medium is added thereto to reduce the stabilizer concentration to the desired level. A particularly effective method involved initially mixing the stabilizer with 3 to 30% of a soap-forming fatty acid, raising the temperature of the resulting mixture above the melting point of the stabilizer, thereafter adding thereto an aqueous solution of alkali such as sodium hydroxide or potassium hydroxide with stirring to form an aqueous dispersion of stabilizer wherein the formed soap acts as a dispersing aid, and finally diluting the resulting dispersion to the desired concentration.

The following examples illustrate several typical embodiments of the present invention, all proportions being expressed herein as well as in the appended claims on a weight basis unless otherwise stated.

*Example 1*

5 parts of oleic acid and 100 parts of 2,6-di-tert-butyl-4 methyl phenol (melting point 154–156° F.) were mixed and the resulting organic mixture was heated to about 240° F. and agitated. While agitating, 7.1 grams of sodium hydroxide dissolved in 20.3 grams of water were added to the hot organic mixture to convert the oleic acid to soap. Finally, while still agitating, a further amount of 400 grams of cold water having a temperature of about 65 to 100° F. was added to the hot mixture to obtain a dispersion having the desired inhibitor concentration. The time required for making up this dispersion was about one-half hour, compared to about 48 hours required when similar dispersions are prepared by the customary ball-milling technique. Moreover, photomicrographs have shown that the dispersion thus prepared contained the stabilizer in the form of very much smaller particles than in the case of the ball-milled dispersion. In a similar run where hot water (150° F.) was used in lieu of cold water in adjusting the final stabilizer concentration, a somewhat larger particle size resulted, though even this size was still substantially smaller than in the ball-milled dispersion. Cool water is beneficial because its sudden quenching effect causes the formation of numerous crystallization centers whereas under gradual cooling the stabilizer crystals are fewer in number and somewhat larger in size. Agitation on cooling is preferably avoided as it also promotes the formation of somewhat larger particles.

When added to a synthetic rubber latex, the dispersion prepared as described above leads to an exceptionally effective utilization of the stabilizer in the rubber-like polymer.

*Example 2*

10 grams of oleic acid, 10 grams of isopropanol and 100 grams of 2,6-di-tert-butyl-4 methyl phenol were mixed, heated to 240° F. with agitation in closed vessel, and a 25% sodium hydroxide solution in sufficient quantities for 100% neutralization of oleic acid was added while continuing the agitation. Finally, about 400 grams of water were added to bring the stabilizer dispersion to the preferred strength of about 20%. Due to the action of the alcohol, the resulting small-particle dispersion was even more resistant to coagulation than the one of Example 1.

Besides isopropyl alcohol, other aliphatic alcohols having 3 to 8 carbon atoms such as butyl alcohol, amyl alcohol, or an octyl alcohol may be used similarly.

*Example 3*

100 grams of 2,6-di-tert-butyl-4-methyl phenol and 40 grams of a dispersing solution consisting of 50% sodium sulfonate derived from a petroleum base, 25% isopropanol and 25% water were mixed and heated above the melting point of the phenol, preferably to 240° F. While agitating the heated mixture, an additional amount of water was added to obtain a stabilizer dispersion having the desired concentration, and the resulting mixture was allowed to cool to room temperature. Again a dispersion of high colloidal and electrolytic stability and very fine particle size was obtained.

*Example 4*

100 grams of 2,6-di-tert-butyl-4-methyl phenol, 30 grams of dispersing solution consisting of 50% sodium sulfonate derived from a petroleum base, 25% isopropanol and 25% water, and 5 grams of oleic acid were mixed. The oleic acid was neutralized with a 25% solution of sodium hydroxide and heated to 240° F. while agitating. Finally, while continuing the agitation, sufficient water was added to form a dispersion containing about 20 weight percent of inhibitor in a finely dispersed state.

*Example 5*

100 grams of 2,2-bis(4-hydroxyphenyl)-propane were mixed with 60 grams of oleic acid and the mixture heated to about 200° F. While agitating, a 25% solution of sodium hydroxide was added to the hot mixture in a quantity sufficient to neutralize the acid and, with further stirring, water was added to dilute the dispersion until a stabilizer concentration of 20% was obtained.

*Example 6*

The effectiveness of stabilizer dispersions prepared by the new method and consequently having an exceptionally small particle size and high resistance to coagulants, becomes clearly apparent when such dispersions are added to a synthetic latex as shown by the following data.

The dispersion of dibutyl cresol stabilizer prepared as described in Example 4 above was added on plant scale to samples of a synthetic rubber latex freshly prepared by emulsion polymerization of 65 percent butadiene and 35 percent acrylonitrile. The stabilizer so added amounted to 1% by weight of the polymer present in the latex. Thereafter butadiene was flashed off and residual monomers were steam stripped from the latex, the stripped latex was coagulated with acetic acid, and the coagulated polymer washed and dried at about 200° F. in a tunnel drier. The stabilizer content of the dry polymer samples was determined by refluxing the dry polymer with iso-octane for three hours whereupon the optical density of the iso-octane extract was measured and the actual stabilizer content read from a previously established calibration curve. From a total of 92 independent test samples taken over a period of one month, the average dibutyl cresol content of the produced polymer was found to be between about 0.45 to 0.55% based on the polymer.

By comparison, when the same concentration of a dibutyl cresol dispersion prepared by conventional ball-milling was added to samples of the same latex, the stabilizer content of 62 tested polymer samples averaged between 0.20 and 0.26%, sveral individual samples showing a stabilizer content of only 0.10%.

The stabilizer dispersions prepared as described in the other samples hereof were similarly tested in latices of butadiene acrylonitrile copolymers having an acrylonitrile content of 26% and 35% respectively. In comparison with analogous stabilizer dispersions prepared by ball-milling, the stabilizer content of the dry finished polymers was in each instance about twice as large when the stabilizer dispersion was prepared in accordance with the present invention.

It is apparent from the foregoing that the novel method of preparing stabilizer dispersions at temperatures above the melting point of the stabilizer offers a valuable means of increasing the effective utilization of stabilizers in polymers and of reducing the loss of stabilizer normally encountered in the finishing operations. The principal advantage of the dispersions prepared by the new method is probably attributable to the exceptionally fine particle size which makes the stabilizer more compatible with the polymeric latex and less susceptible to be precipitated apart from the polymer particles.

The dispersions produced in accordance with the present invention are generally usable with all aqueous latices of rubber-like or resinous polymers or copolymers of diolefins. The preparation of such polymers from feeds containing a diolefin such as butadiene, isoprene or dimethyl butadiene, and especially from feeds containing a major proportion of the diolefin and a minor proportion of monoethylenically unsaturated monomers such as acrylonitrile or styrene requires, as is well known, the formation of an aqueous emulsion of the polymerizable feed, which is thereafter heated in the presence of a peroxy catalyst such as potassium persulfate and preferably a polymerization modifier such as lauryl mercaptan. After termination of the polymerization reaction at a desired level, e. g. by adding a short-stopper such as hydroquinone, the unreacted monomers are removed from the resulting latex by flashing and stripping. Subsequently, after a variable storage period, the latex is coagulated, preferably in a continuous manner which may involve a first stage wherein the latex is creamed, e. g. by a 26% sodium chloride solution, and a second stage wherein the creamed latex is coagulated with acetic acid. Finally, the coagulate normally may pass through a roller press for excess water removal, through a hammer mill where it is restored to its normal coagulate size, and then through a drier.

It will be understood that the synthesis of the latex forms no part of the present invention and is being described herein merely to facilitate a better understanding of the invention. The novel stabilizer dispersions may be added to the latex to be stabilized either directly after synthesis of the latex or after subsequent processing steps, e. g. after stripping or preferably during the creaming or coagulation steps. Addition after removal of uncombined monomers from the latex is particularly effective in increasing stabilizer utilization as it avoids loss of stabilizer by volatilization during the flashing and stripping operations. This also avoids the loss which otherwise occurs when the stabilizer is present in the earlier steps wherein there is considerable tendency for the stabilizer to prefloc or to be thrown out of the latex during butadiene flashing. This is especially true in the case of stabilizers which are soluble in uncombined monomers. For instance, when a dispersion of an alkylated phenol is added to a latex still containing some butadiene monomer, the phenol partially dissolves in the monomer, only to be precipitated out of the latex during the subsequent operation and thus becoming lost as far as any later protection of the polymer is concerned.

It will also be understood that while only certain particular embodiments of the invention have been described herein, numerous variations thereof are possible without departing from the spirit of the present invention or from the scope of the appended claim. For instance, while the examples describe the preparation of dispersions containing 20% stabilizer in an aqueous medium, dispersions containing between 1 and 50%, or preferably 5 and 30% of stabilizer can be prepared in a similar manner. Likewise, while water was used in the present examples to reduce the stabilizer concentration of the original dispersion to the desired final level, a portion of the latex itself or some other aqueous medium, e. g. aqueous ammonia used to keep the latex from coagulating may be added instead with similar effect.

We claim:

A method of preparing an aqueous stabilizer dispersion of fine particle size which comprises mixing 100 parts of 2,6-ditertiary butyl-4-methyl phenol, 5 to 60 parts of sodium sulfonate and 5 to 30 parts of an aliphatic alcohol of 3 to 8 carbon atoms, heating the resulting mixture at about 240° F. while agitating and quenching the resulting heated dispersion with sufficient cold water to give a stabilizer concentration of about 5 to 30%.

JOHN R. GILCREASE.
MACK C. FUQUA.

References Cited in the file of this patent
UNITED STATES PATENTS

| Number | Name | Date |
|---|---|---|
| 1,778,760 | Hay | Oct. 21, 1930 |
| 2,069,294 | Wilson | Feb. 2, 1937 |
| 2,090,629 | Hiers et al. | Aug. 24, 1937 |
| 2,432,830 | Sturgis | Dec. 16, 1947 |